United States Patent
Schafer (10) Patent No.: US 7,921,942 B2
(45) Date of Patent: Apr. 12, 2011

(54) AMPHIBIOUS ALL TERRAIN VEHICLE WITH TRACK ASSEMBLIES

(76) Inventor: Timothy A. Schafer, Adair, IA (US)

( * ) Notice: Subject to any disclaimer, the term of this patent is extended or adjusted under 35 U.S.C. 154(b) by 15 days.

(21) Appl. No.: 12/459,434

(22) Filed: Jul. 1, 2009

(65) Prior Publication Data

US 2011/0000732 A1 Jan. 6, 2011

(51) Int. Cl.
*B62D 55/04* (2006.01)
(52) U.S. Cl. .................................. 180/9.21; 301/111.01
(58) Field of Classification Search .................. 180/9.3, 180/9.21, 9.22–9.28, 9.32–9.36; 301/111.01
See application file for complete search history.

(56) References Cited

U.S. PATENT DOCUMENTS

| | | | | | |
|---|---|---|---|---|---|
| 2,698,667 | A | * | 1/1955 | Kropp | 180/365 |
| 3,190,384 | A | * | 6/1965 | Dufresne | 180/6.7 |
| 3,476,207 | A | * | 11/1969 | Ryan | 180/6.7 |
| 4,410,219 | A | * | 10/1983 | van der Lely | 305/180 |
| 4,516,649 | A | * | 5/1985 | Braathen | 180/9.1 |
| 4,865,141 | A | * | 9/1989 | Gey | 180/9.26 |
| 5,361,860 | A | * | 11/1994 | Smith et al. | 180/9.21 |
| 6,135,220 | A | * | 10/2000 | Gleasman et al. | 180/9.1 |

\* cited by examiner

*Primary Examiner* — Tony H. Winner
(74) *Attorney, Agent, or Firm* — G. Brian Pingel; Camille L. Urban

(57) ABSTRACT

An amphibious all terrain vehicle having a body and at least three wheel and axle assemblies on each side and a pair of ground engaging track assemblies which are mounted on tires on either side of the vehicle. Each of the wheel and axle assemblies include an axle shaft supported by and positioned transverse to the vehicle body so that the wheel and axle assemblies form a front assembly, a rear assembly and at least one middle assembly. Each of the axle shafts has an axle extension with the axle extensions of the front and rear wheel and axle assemblies being fixed extensions and the axle extensions on at least the middle assemblies are idler axle extensions to permit the wheels on such assemblies to move in a free wheeling mode relative to their respective axle shafts.

10 Claims, 7 Drawing Sheets

AMPHIBIOUS ALL TERRAIN VEHICLE WITH TRACK ASSEMBLIES

BACKGROUND OF THE INVENTION

1. Field of the Invention

The present invention relates in general to an all terrain vehicle having track assemblies driven by the wheels on the vehicle and more specifically to a vehicle that utilizes only certain of its wheels for driving the track assemblies.

2. Description of the Prior Art

Most modern skid steer type amphibious all terrain vehicles (AATV) use a single transmission to independently drive a set of axles and wheels on each side of the vehicle that are connected together and kept in time with one another through a series of chains and sprockets. Such machines require the use of soft, low pressure tires (which often vary slightly in total outside circumference) and it is known in the art to convert these vehicles to improve their traction by installing track assemblies on either side of the vehicle that surround the wheels and are driven thereby. There are several different track options to create a continuous band of tread that wraps around the tires such as rubber, plastic, metal and/or a combination of two or more materials. By the use of tracks, the vehicle is provided a larger footprint, while not giving up the added floatation provided by the rims and tires thereof.

When using tracks on any skid steer AATV, a slight variance in the outside circumference of the tires running inside of each track assembly creates problems in the form of a constant "scrubbing" affect that the tires have to make in order to continue to turn and cover unequal distances on the inside surface of the track assembly. Consequently, operational problems result such as:

1. Loss of power and performance due to excessive rolling resistance (rubbing) of the drive tires with the inside of track assembly, often resulting in excessive chain windup and severe chain binding or broken chains and chain tensioners, excessive and premature wear on outer axle bearings, seals and tires, broken axle assemblies, etc.

2. Difficulty in turning due to the larger flat contact area of the track assembly that must skid in order to pivot or rotate the vehicle to a new angle of direction.

3. Difficulty in climbing up severe approach angles or keeping forward momentum on soft surfaces that require greater floatation.

4. A difficult and time consuming task of modifying and reducing the final drive gearing of the vehicle for maximum low speed and high torque applications necessary with track assemblies, and then to return it to the higher gear setting desired for standard operation with out tracks using the wheels only.

Major AATV manufacturers have realized the above problems and are now instructing dealers or vehicle owners to first measure the outside circumference of each tire and then stagger each of the tires in a certain pattern with the smallest in the front, the largest next, then the next largest and lastly the next smallest. Such strategy does not eliminate the stress created, but helps spread it out over the entire drive chain and reduces the damage that is incurred due to the stress.

Manufacturers often make note in their assembly instructions that there is a range of about 3 inches of outside circumference tire variance, but in the inventor's experience it is not uncommon to see up to about 5 inches of difference. This means that even if a staggering of tires is performed, such difference in circumference will cause the second tire back to have to scrub as much as 5 inches on the inside of the track surface during a single rotation with similar affects on all other tires running inside of the track.

Another alternative for reducing the scrubbing action of the tires on the track assemblies is to remove certain chain loops on the rear axles and thereby allow them to turn freely. This eliminates the transfer of drive power to some of the axle and wheel assemblies of the vehicle, for example, to have only the front most axle and wheel assembly in driving engagement. However, this alternative is a difficult and messy solution to the problem and often will cause the tires of the powered wheels axle assemblies to slip and free spin inside of the tracks.

The present invention is adapted to provide a means for relatively quickly, easily and inexpensively adapting the driving action of the axle and wheel assemblies on AATV's in a manner so as to reduce or essentially entirely eliminate the deficiencies inherent in utilizing track assemblies on an AATV while maintaining drive power to both the front and rear tires of the vehicle.

SUMMARY OF THE INVENTION

The present invention provides an amphibious all terrain vehicle having a body and at least three wheel and axle assemblies on each side and a pair of ground engaging track assemblies, which are mounted on tires on either side of the vehicle. Each of the wheel and axle assemblies include an axle shaft supported by and positioned transverse to the vehicle body so that the wheel and axle assemblies form a front assembly, a rear assembly and at least one middle assembly. Each such assembly also includes an axle hub plate and bearing disposed on each of the free ends of said axle shaft, an axle extension mounted on each of the hub plates, a wheel secured on each of the axle extensions and a tire mounted on each of the wheels.

The invention is characterized by employing axle extensions on said middle wheel and axle assemblies that are idler extensions to permit the wheels on said assembly to move in a freewheeling mode relative to the axle shafts of said assemblies. Each of the track assemblies of the vehicle are mounted on opposite sides of the vehicle and are trained about the tires so that only the tires on the front and rear wheel and axle assemblies provide driving power to the track assemblies. A system for implementing the apparatus of the present invention is also disclosed.

As a result of the use of the idler extensions on the middle most wheel and axle assemblies, the tires of said assemble are able to rotate in a manner that is not synchronized with the movement of the tires on the front and rear wheel and axle assemblies to essentially eliminate any scrubbing action between such tires and the vehicle's track assemblies. Thus, it is an object of the present invention to provide an all terrain vehicle that can be converted to a track assembly configuration in a relatively simplistic and inexpensive manner, and also increase the amount of drive power provided to the track assemblies as well as reduce the friction the track assemblies are subjected to by the tires of the vehicle.

The foregoing and other advantages of the present invention will appear from the following description. In the description, reference is made to the accompanying drawings, which form a part hereof and in which there is shown by illustration and not of limitation a specific system and method in which the invention may be embodied. Such embodiments do not represent the full scope of the invention, but rather the invention may be employed in a variety of other embodiments and reference is made to the claims herein for interpreting the breadth of the invention.

DETAILED DESCRIPTION OF THE PREFERRED EMBODIMENT

Figure 1:
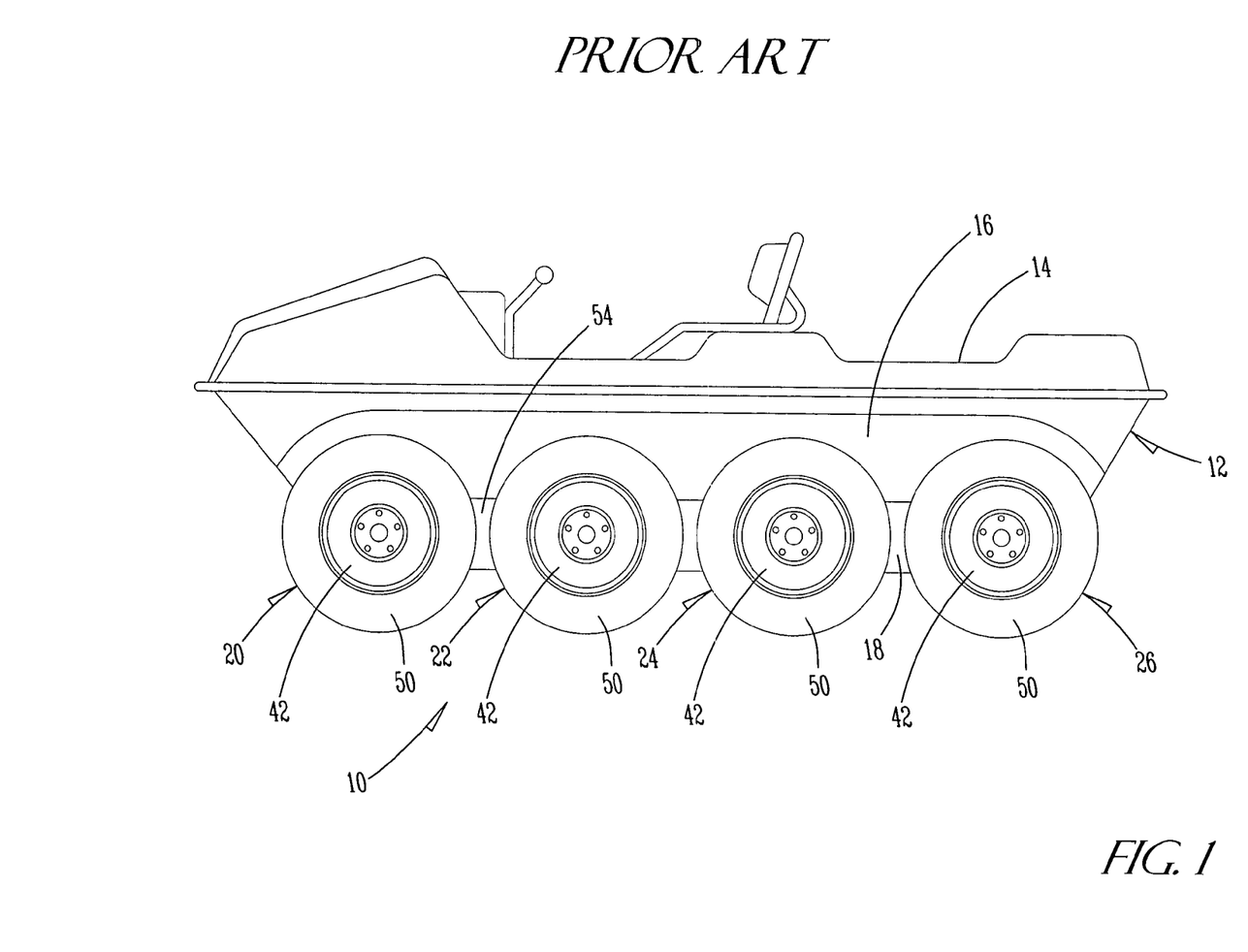
FIG. 1 is a diagrammatic view of a typical amphibious all terrain vehicle in side view having a body and four wheel axle and assemblies mounted on the side of the body shown.

Referring now to the drawings and with reference first to FIG. 1, a diagrammatic side view of a typical amphibious all terrain vehicle (AATV) manufactured by Ontario Drive & Gear Limited and sold under the trademark "Argo" is shown in FIG. 1 at 10. Various types of other AATV's such as the vehicle 10 have been sold worldwide and have proven their capability as reliable off-road vehicles for travel in remote regions.

Figure 4:
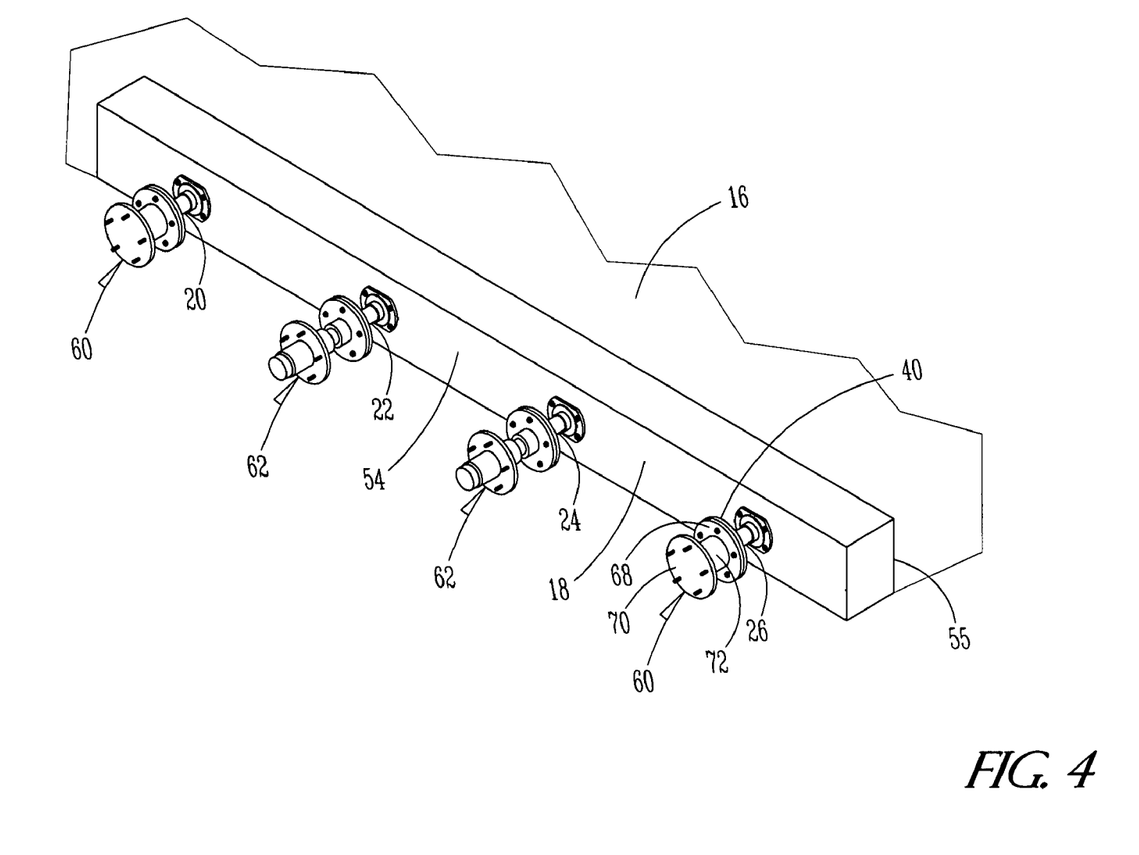
FIG. 4 is a side, fragmentary, perspective view similar to that of FIG. 2 but showing axle extensions mounted on each of the hub plates shown in FIG. 2.

The vehicle 10 has a hard plastic or fiberglass water tight tub shaped frame-type body 12 with a passenger compartment area 14 large enough to seat up to six persons and having opposite sides that each support a box beam 18 (see FIG. 4). Normally, the body 12 is held in an off the ground position by a plurality of wheel and axle assemblies 20-26 on each side of the body 12 arranged in a parallel and spaced apart alignment with respect to the body 12 in a front, middle and rear relationship. Although the vehicle 10 is depicted as having four of the wheel and axle assemblies on each side, other AATV models may only include three such assemblies.

Figure 2:
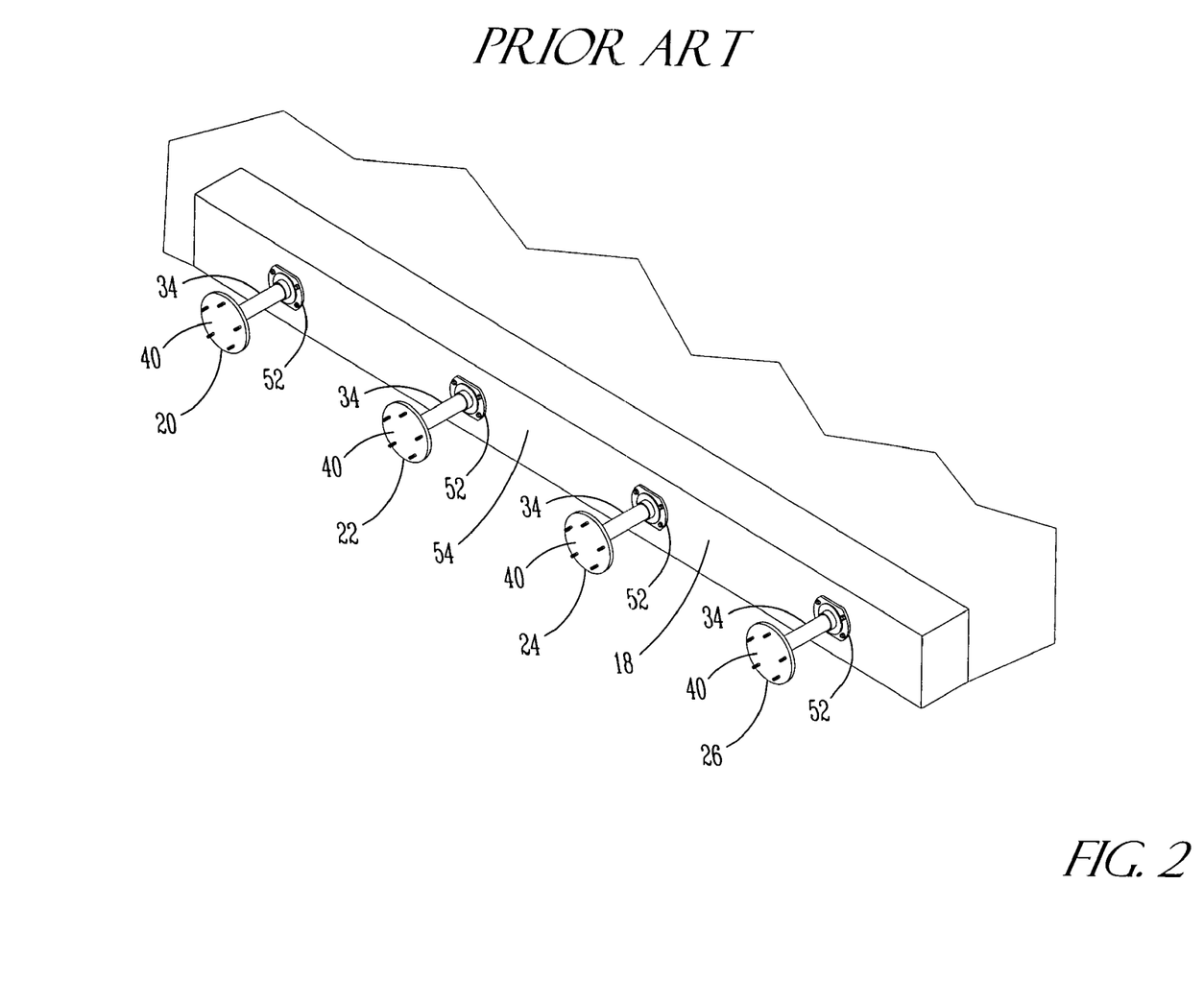
FIG. 2 is a side, fragmentary, perspective view of a portion of an all terrain vehicle similar to that shown in FIG. 1 but with the wheels and tires removed from the vehicle to expose the outer ends of the axles and axle hub plates disposed thereon.

Referring now to both FIGS. 1 and 2, the wheel and axle assemblies 20-26 are each formed respectively of axle shafts 34 (see FIG. 2) rotatably supported by opposite sides of and positioned transverse to the box beams 18, axle hub plates 40 disposed on each of the free ends of said axle shafts 34, wheels 42 secured on each of said hub plates 40 and low pressure (around 2 psi) balloon tires 50 mounted on each of said wheels 42 to provide the only suspension for the body 12. As is clearly shown in FIG. 2 in which the vehicle 10 is shown with the wheels 42 and the tires 50 removed, the axle shafts 34 extend outwardly about 8" from bearings 52 mounted in an outer sidewall 54 of the box beam 18 to accommodate the relatively wide width of the tires 50. Similar bearings 52 are mounted in an inner sidewall 55 so that the axle shafts 34 are free to rotate with respect to the box beams 18.

To provide the vehicle 10 with its reliable off road running ability, all of the wheels 42 are normally driven in a synchronized relationship by the use of sprockets (not shown) mounted on the axle shafts 34 and chains (not shown) that connect such sprockets together, all as is well-known in the AATV field of art as shown in Argo 8×8 Avenger Parts Manual No. 899-40-7 dated Apr. 5, 2009 by Ontarior Drive & Gear Limited and incorporated herein by reference. The vehicle 10 utilizes a single transmission to independently drive the axle and wheel assemblies 20-26 on each side in a synchronized manner through the chains and sprockets associated with such assemblies.

The wheels 42 are nonsteerable and directional control of the vehicle 10 is accomplished through skid steering-just as on a tracked vehicle-either by braking the wheels on the side in the direction you want to turn, or by applying more throttle to the wheels on the opposite side. On land, the combination of the large number of wide wheels and tires, low tire pressure and low vehicle weight all result in exceptionally low ground pressure, high grip off-road ability.

AATV's, such as the vehicle 10, provide a user with a reliable and convenient means for traveling in remote areas. However, it has been found that under certain types of weather or terrain conditions, such as snow or marshy land, that the traction of the tires 50 may be sufficiently compromised such that maneuverability of the vehicle 10 is significantly reduced. In some instances the vehicle 10 may even become immobile.

Figure 3:
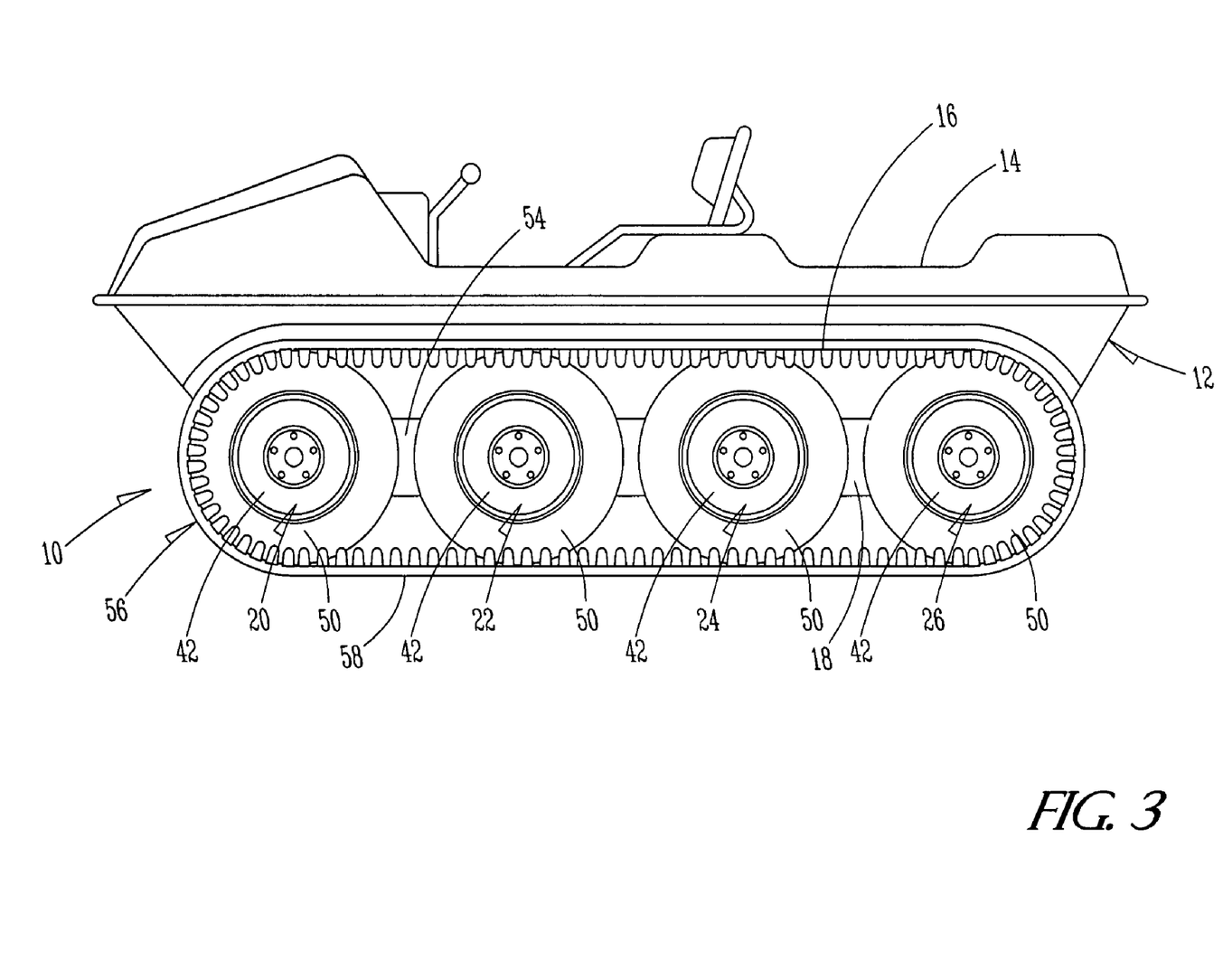
FIG. 3 is a view similar to that of FIG. 1 but showing a ground engaging track assembly surrounding the tires of the wheel and axle assemblies.

To increase the mobility of typical AATV's during such travel conditions, it has become relatively standard practice to employ track assemblies 56, as indicated in FIG. 3, with a band-type track 58 that is installed to wrap around the tires 50 and provide a continuous bearing surface with respect to the ground on each side of the vehicle 10. There are a number of options for the type of track assemblies 56 that may be utilized on the vehicle 10 in terms of the different types of materials forming the tracks 58. Although rubber is used most often, plastic, metal and/or a combination of two or more such materials may also be used to create a continuous track 58 that wraps around the tires 50 to provide a large footprint, while maintaining the floatation of the vehicle 10 provided by the wheels 42-48 and tires 50 themselves.

When using the track assemblies 56 on the vehicle 10, the fact that the circumferences of the tires 50 may vary in size as much as 3-5 inches makes it impossible to keep all the running surfaces of the tires 50 in time with the inside surface of the tracks 58. Instead, with the low pressure tires 50 locked together in a common rotational timing and placed inside of the track assemblies 56, the end result is a constant "scrubbing" action between the tires 50 and the tracks 58 in order for the tires 50 to continue to turn and cover unequal distances on the inside surface of the tracks 58. Such interaction between the tires 50 and the tracks 58 detrimentally affects the operation of the vehicle 10 as described above. Accordingly, it is highly desirable to be able to change the drive speed of the tires 50 to minimize such problems and improve the operational performance of the vehicle 10.

Currently the only way to change the synchronized drive gearing on the vehicle 10 to vary the drive speed of the tires 50 is to either: (1) change gears in the transmission (which is not simple or a user friendly process); (2) change the drive sprockets between the transmission and the axle shafts 34 (which is also difficult and messy and is physically limited to how large of a lower drive sprocket can be used to widen the gear ratio and help decrease the final drive speed); or (3) to reduce the size (outer circumference) of the tires 50 that are used inside of the track assemblies 56 which directly compromises ride height and ground clearance. Because none of these alternatives provides a simplistic and efficient means for re-gearing the track assemblies 56, a need exists in the industry to make it more convenient for changing the final gearing on an AATV track assembly arrangement. Thus, the present invention is adapted to provide a fourth alternative for re-gearing the final drive speed and one that is relatively easily accomplished as will now be described.

Referring now to FIG. 4, a side perspective view of the vehicle 10, similar to that of FIG. 2, showing such vehicle with the wheels removed is depicted. By comparing FIGS. 2 and 4, it can be seen that axle extensions 60 have been mounted on the front and rear hub plates 40 of the axle and wheel extensions 20 and 26. In contrast, idler axle extensions 62 have been mounted on the hub plates 40 of the two middle axle and wheel assemblies 22 and 24. To mount the track assemblies 52 on the vehicle 10, the axle extensions 60 and 62 are required as a result of the width of the assemblies 52 being larger than the width of the tires 50 so that the assemblies 52 can be utilized without rubbing against the sidewalls 54 of the box beams 18.

Figure 5:
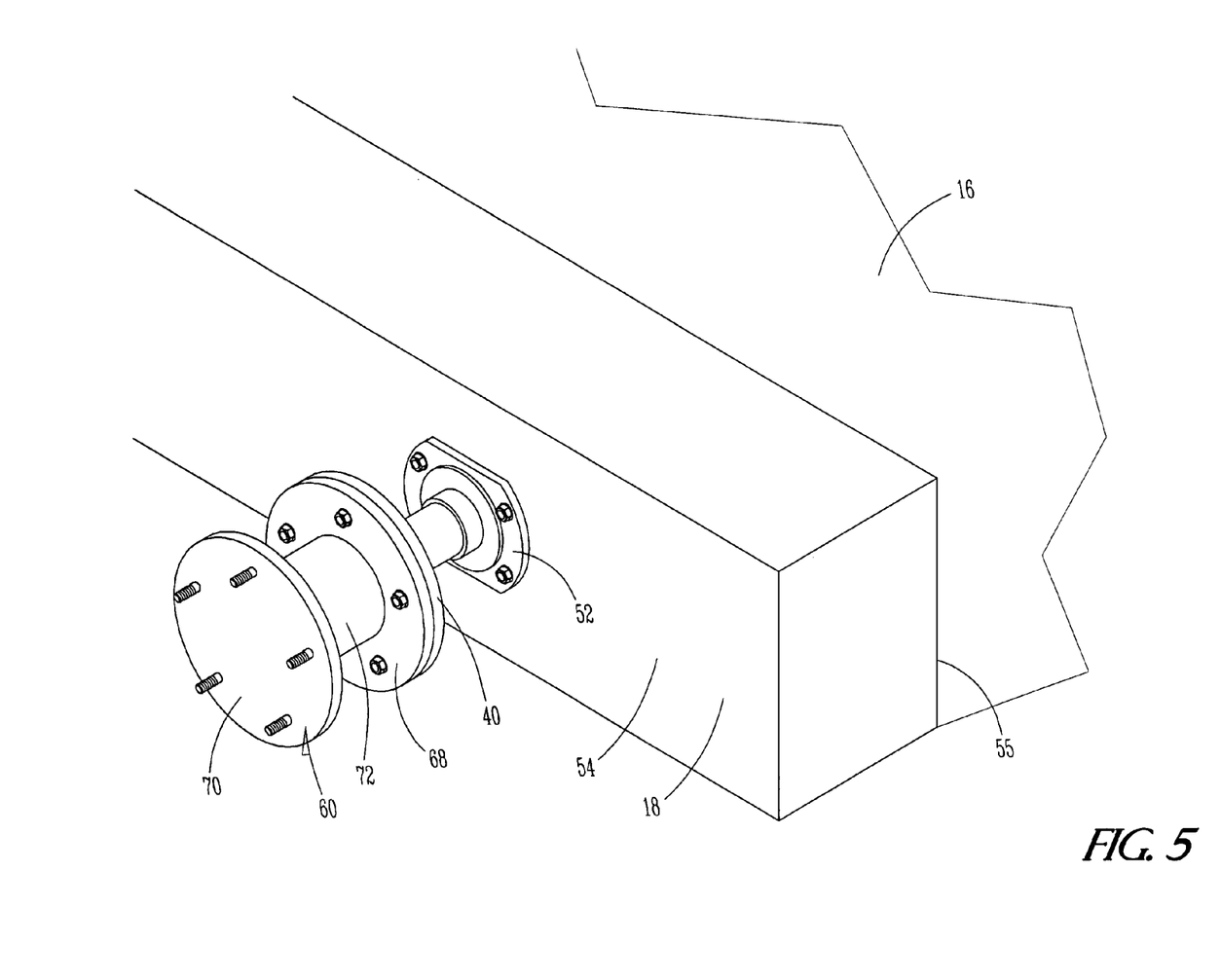
FIG. 5 is an enlarged fragmentary, perspective view of the type of axle extension that is mounted on the front and rear wheel and axle assemblies shown in FIG. 4.

As shown best in FIG. 5, each of the axle extensions 60 is simply formed of an inner hub plate 68 that is attached by bolts and nuts to one of the hub plates 40 of the axle and wheel assemblies 20 or 26, an outer hub plate 70 that has bolts for mounting the wheels 42 and a central hub portion 72 that is fixed to the plates 68 and 70. Thus, the axle extension 60 serves to directly transmit all driving force supplied to the hub plate 40 to the outer hub plate 70 and then to its associated wheel as is well-known in the art.

Figure 6:
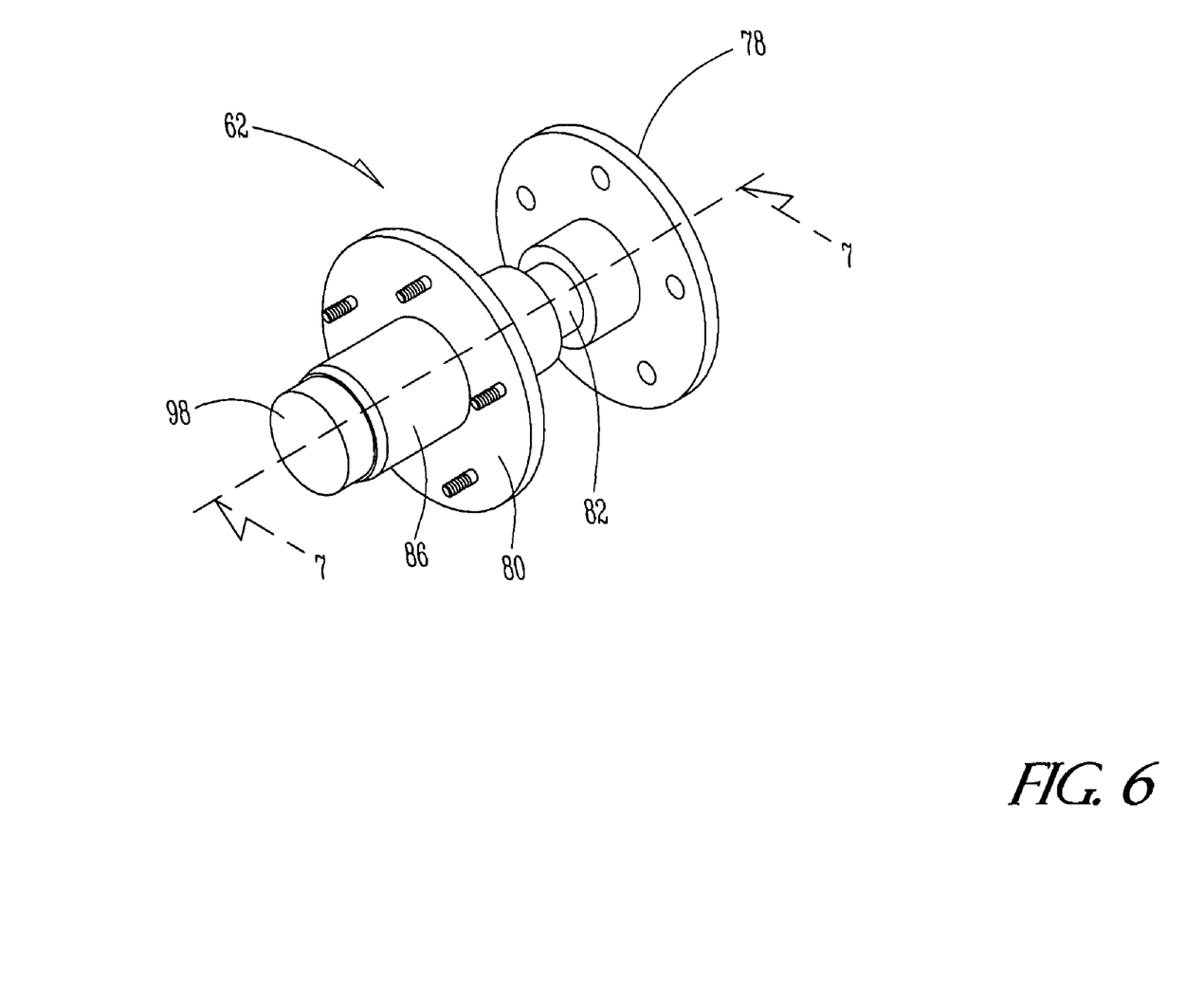
FIG. 6 is an enlarged perspective view of the type of axle extension that is mounted on the middle wheel and axle assemblies shown in FIG. 4 to provide an idler axle extension.
Figure 7:
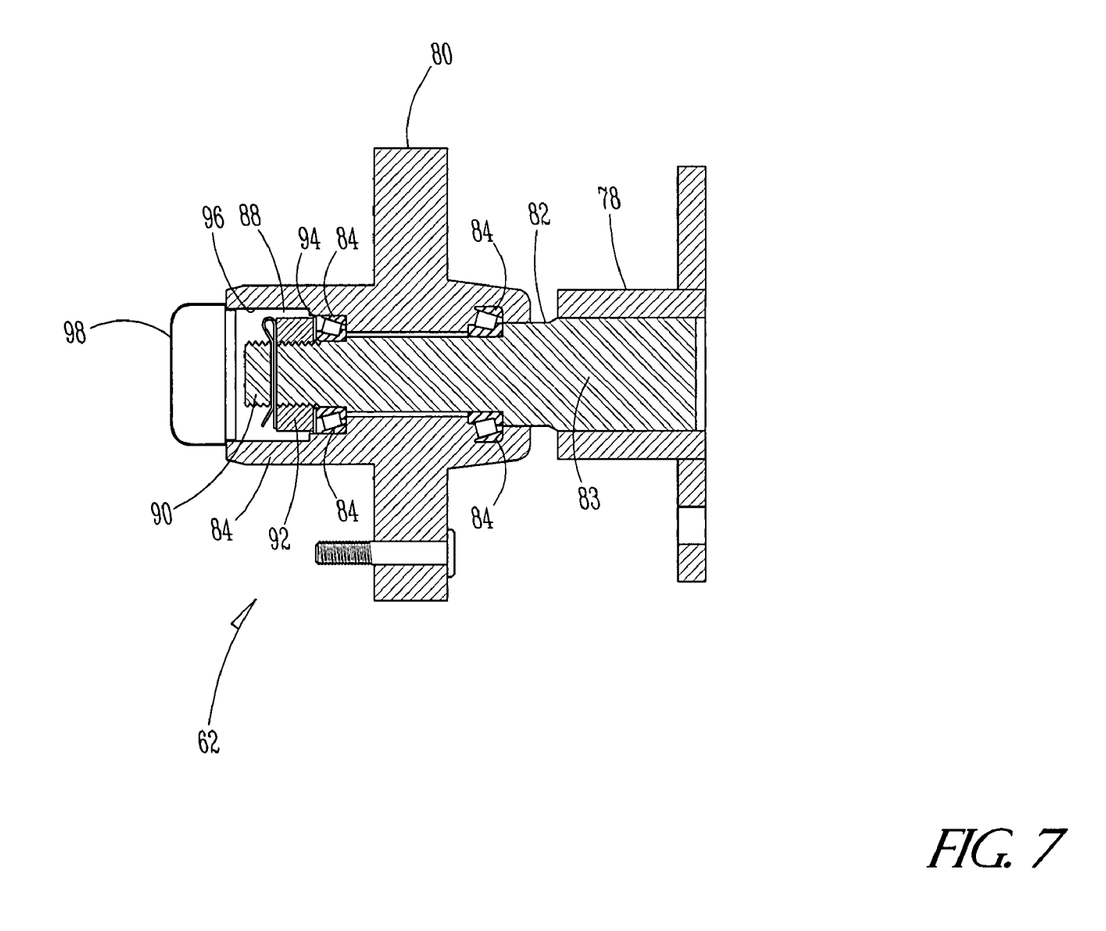
FIG. 7 is a cross-sectional view of the idler extension taken along the line 7-7 shown in FIG. 6.

In contrast to use of the fixed axle extensions 60 for the middle axle and wheel assemblies 22 and 24, the present invention resides in the utilization of the idler axle extensions 62, as best shown in FIGS. 6 and 7. Each of the idler axle extensions 62 includes an inner hub plate 78 and an outer hub plate 80 just as the axle extensions 60, but the axle extensions 62 are constructed to allow the plate 78 to move relative to the plate 80.

To permit relative movement between the plates 78 and 80, the axle extensions 62 include a spindle type hub 82 that has an inner end 83 and is fixed to and extends outwardly from the hub plate 78. The outer hub plate 80 is mounted on the hub 82 via roller bearings 84 to provide for rotational movement of the hub plate 80 with respect to the hub plate 78. As shown in FIG. 7 the outer hub plate 80 has a neck portion 86 with a recessed cavity 88 into which extends an outer end 90 of the hub 82. To secure the hub plate 80 on the hub 82, the hub outer end 90 is threaded and a nut 92 and washer 94 are mounted thereon. Preferably a cotter pin 96 is positioned through the hub outer end 90 to make certain the nut 92 remains in place. A dust cap 98 is used to close off the cavity 88 from dirt and dust. By use of the idler axle extensions 62 on the middle wheel and axle assemblies 22 and 24, such assemblies no longer are utilized for driving the track assemblies 56 which permits the tires 50 of such assemblies to freely rotate in correspondence to movement of the tracks 58 without any drive train binding and tire scrubbing.

The operational advantages provided by the use of the idler axle extensions 62 can be further enhanced by a proper selection of the tires 50 on the vehicle 10 so that the two closest sized tires 50 on each side are mounted on the wheel and axle assemblies 20 and 26 to be positioned in the front and rear positions of the vehicle 10 (and used to drive the track assemblies 56). The remaining tires 50 can then be mounted on the center two wheel and axle assemblies 22 and 24 and allowed to freewheel so as to not cause any binding. Obviously, if the tires 52 of the front and rear wheel and axle assemblies 20 and 26 are exactly of the same circumference, all track binding and tire scrubbing will be essentially eliminated. If there is a slight size difference between the front and rear tires 50, the smallest ones should be placed on the front wheel and axle assembly 20 to allow what little remaining track binding exists to be utilized to pre-load the entire drive train on that side so that in extremely slippery conditions such as mud, if one drive wheel should try to slip inside of the track, then the second drive wheel is already tensioned and will not allow any unwanted slippage.

The result of closely sized tires on the front and rear drive and axle assemblies 20 and 26 and different sized freewheeling tires 50 in the middle positions of the vehicle 10 is very noticeable and eliminates most of the unwanted drive train binding, allowing the vehicle 10 to roll much easier, which increases the performance and makes operation of the vehicle 10 noticeably quieter and significantly less difficult to maintain.

It should also be noted that by use of the idler extensions 62 it is possible to utilize similarly sized small tires 50 in the front and rear positions of the vehicle 10 to serve as propulsion for the track assemblies 56 and to run much larger tires in the middle positions, which results in additional operational gain in that the surface pressure of the track assembly 56 is focused on the center of the vehicle 10 and greatly improves its ability to pivot while trying to turn. Also, such tire placement allows the vehicle 10 to have a rounded track bottom profile and enables the vehicle 10 to have the ability to rock back when attempting to climb an obstacle and not having to give up as much footprint and traction during the transition.

Machines with rounded track bottom profiles have a huge advantage in off-road situations and are much better at negotiating difficult terrain. Also, this advantage makes it easier for a tracked vehicle 10 to continually get on the top of a soft surface and maintain its floatation as opposed to simply plowing through softer terrain. Another advantage provided by such tire arrangement is that it maintains the maximum ground clearance provided by the larger circumference center tires, but reduces the drive speed with the smaller circumference tires providing the driving power. The benefit of this is that when the tracks are not in use, the standard extensions and idler extensions can be easily removed and the normal (larger tires) can be replaced and increase the final drive speed back up to normal as desired for regular tire operation.

Thus, the present invention provides a relatively convenient and efficient means for converting an AATV from operating on the tires 50 to the use of the track assemblies 52 in a manner that not only essentially eliminates track binding and tire scrubbing, but increases the drive power of the vehicle 10. Consequently, the present invention provides a novel and unique means for allowing a user to make a conversion to the use of track assemblies on the vehicle 10. Although the present invention has been described with respect to a preferred embodiment, it should be understood that such embodiment may be altered without avoiding the true spirit and scope of the present invention.

What is claimed is:
1. An all terrain vehicle having at least three wheel and axle assemblies on each side and a pair of ground engaging continuous tracks, said vehicle comprising:
 (a) a body;
 (b) said wheel and axle assemblies arranged in a parallel and spaced apart alignment and each including;
  (1) an axle shaft rotatably supported by and positioned transverse to said body so that said wheel and axle assemblies form a front assembly, a rear assembly and at least one middle assembly that are each supported by a bearing in said body;

(2) an axle hub plate disposed on a free end of each of said axle shafts;

(3) an axle extension mounted on each of said hub plates; and (4) a wheel secured on each of said axle extensions and a tire mounted on each of said wheels;

(c) said axle extensions of said at least one middle assembly are idler extensions to permit the wheels to move in a free wheeling mode relative to the middle assembly; and (d) each of said tracks is mounted on opposite sides of said vehicle trained about said tires.

2. An all terrain vehicle as described in claim 1, wherein said axle shafts are driven in a synchronized relationship.

3. An all terrain vehicle as described in claim 1, wherein each of said idler extensions are formed of a hub and a hub plate that is journaled on said hub to allow relative movement of said hub plate with respect to said hub.

4. An all terrain vehicle as described in claim 1, wherein the outside circumferences of the tires on said middle wheel and axle assembly are larger than those of the tires on said front and rear assemblies.

5. An all terrain vehicle as described in claim 1, wherein said ground engaging tracks are solely driven by the tires of said front and rear assemblies.

6. An all terrain vehicle having a frame and at least three wheel and axle assemblies mounted on said body in a front to rear relation and a pair of ground engaging tracks, said vehicle comprising:

(a) said wheel and axle assemblies each including:

(1) an axle positioned transverse to said body;

(2) an axle hub plate disposed on each of the free ends of said axles;

(3) an axle extension mounted on each of said hub plates; and (4) a wheel secured on each of said axle extensions and a tire mounted on each of said wheels;

(b) said axle extensions of front and rear axle and wheel assemblies are formed to transmit drive power from said axles to said wheels;

(c) said axle extensions of said axle and wheel assemblies located between said front and rear axle and wheel assemblies are idler extensions to permit the wheels to move in a free wheeling mode relative to their said associated axle and wheel assembly; and (d) each of said tracks is mounted on said tires.

7. An all terrain vehicle as described in claim 6, wherein said tracks are solely driven by the tires of said front and rear wheel and axle assemblies.

8. A method for mounting a pair of ground engaging continuous tracks on an all terrain vehicle having at least three wheel and axle assemblies on each side that are arranged in a parallel and spaced apart alignment with a front pair of assemblies, a rear pair of assemblies and at least one pair of middle assemblies, which assemblies each include an axle shaft, an axle hub plate mounted on a free end of each of said axle shafts, an axle extension mounted on each of said hub plates; and a wheel secured on each of said axle extensions with a tire mounted on each of said wheels, said method comprising:

(a) selecting said axle extensions from a group composed of fixed axle extensions that transmit drive power from said axle shafts to said wheels and idler axle extensions that allow said wheels to rotate relative to said axle shafts, and arranging said axle extensions so that said wheel and axle assemblies of said front and rear assemblies have fixed axle extensions and the middle wheel and axle assemblies have an idler axle extension;

(b) determining the outside circumference of the tires on said wheel and axle assemblies;

(c) arranging said wheel and axle assemblies such that the tires with the smallest outside circumference are on the front and rear wheel and axle assemblies and the tires with the largest outside circumference are on said middle axle assemblies; and (d) installing said continuous tracks about the tires on each side of said vehicle.

9. A method as described in claim 8 wherein each of said idler axle extensions are formed of a hub and an outer hub plate that is rotatably mounted on said hub to allow relative movement of said hub plate with respect to said hub.

10. A method as described in claim 8 wherein each of said idler axle extensions is formed of an inner hub plate, a hub fixed to and extending outwardly from said inner hub plate and an outer hub plate that is mounted on said hub to allow said outer hub plate to freely move relative to said inner hub plate.

* * * * *